United States Patent [19]

Hirosawa et al.

[11] 4,379,859

[45] Apr. 12, 1983

[54] PRE-FOAMED PARTICLES OF POLYPROPYLENE RESIN AND PROCESS FOR PRODUCTION THEREOF

[75] Inventors: Kuninori Hirosawa, Isehara; Sumio Shimada, Hiratsuka, both of Japan

[73] Assignee: Japan Styrene Paper Corporation, Tokyo, Japan

[21] Appl. No.: 322,917

[22] Filed: Nov. 19, 1981

[30] Foreign Application Priority Data

Nov. 22, 1980 [JP] Japan ............................... 55-164786

[51] Int. Cl.³ .............................................. C08J 9/18
[52] U.S. Cl. ...................................... 521/59; 521/56; 521/60; 521/134; 521/144
[58] Field of Search ............................. 521/56, 59, 60

[56] References Cited

U.S. PATENT DOCUMENTS

| | | | |
|---|---|---|---|
| 3,616,365 | 10/1971 | Stastny et al. | 521/60 |
| 3,709,806 | 1/1973 | Minomi et al. | 521/60 |
| 3,743,611 | 7/1973 | Muroi et al. | 521/60 |
| 4,168,353 | 9/1979 | Kitamori | 521/59 |
| 4,303,756 | 12/1981 | Kajimura et al. | 521/60 |
| 4,303,757 | 12/1981 | Kajimura et al. | 521/60 |

*Primary Examiner*—Morton Foelak
*Attorney, Agent, or Firm*—Sherman & Shalloway

[57] ABSTRACT

Substantially non-crosslinked pre-foamed particles of a polypropylene resin, characterized by the fact that they are composed of an ethylene/propylene random copolymer or a mixture of an ethylene/propylene random copolymer with low density polyethylene and/or an ethylene/vinyl acetate copolymer as a base resin; and a process for producing pre-foamed particles of a polypropylene resin, which comprises dispersing substantially non-crosslinked particles of the polypropylene resin composed of an ethylene/propylene random copolymer or a mixture of an ethylene/propylene random copolymer with low-density polyethylene and/or an ethylene/vinyl acetate copolymer and a volatile blowing agent in water in the presence of a dispersing agent within a closed vessel; heating the dispersion to a temperature above a temperature at which the resin particles soften, thereby to impregnated the blowing agent in the resin particles; and while maintaining the pressure of the inside of the vessel higher than the vapor pressure of the blowing agent, opening one end of the vessel to release the resin particles and water simultaneously into an atmosphere kept at a lower pressure than the inside of the vessel.

9 Claims, No Drawings

PRE-FOAMED PARTICLES OF POLYPROPYLENE RESIN AND PROCESS FOR PRODUCTION THEREOF

This invention relates to pre-foamed particles of a polypropylene resin and a process for the production thereof.

Generally, polypropylene has excellent heat resistance and chemical resistance, high mechanical strength, higher flexibility than polystyrene, and higher rigidity than polyethylene. Various attempts have therefore been made to obtain foamed articles by using polypropylene having these excellent properties. Sheet-like foamed articles of polypropylene by an extrusion molding method have previously been obtained, but no foamed article of polypropylene by a bead molding method has been successfully produced.

It is an object of this invention to provide homogeneous, highly expanded pre-foamed particles of a polypropylene resin which can be used in a bead molding process, and a process for the production thereof.

The present inventors have made extensive investigations in order to achieve this object, and found that an ethylene/propylene random copolymer or a mixture of it with low-density polyethylene and/or an ethylene/vinyl acetate copolymer is suitable as a base resin of the pre-foamed particles. Since a propylene homopolymer or an ethylene/propylene block copolymer presents technical difficulties in pre-foaming because it has poor viscoelastic flow characteristics and the temperature range suitable for its foaming is narrow. Furthermore, since this homopolymer or block copolymer has a high softening temperature, it is difficult to convert into closed cellular pre-foamed particles having a high expansion ratio, and the poor adhesion of the particles to each other occurs during its molding. In contrast, it has now been found that the ethylene/propylene random copolymer of the mixture of it with low-density polyethylene and/or the ethylene/vinyl acetate copolymer (to be sometimes referred to generically as the polypropylene resin) has a lower degree of crystallization, a lower softening temperature and a broader temperature range suitable for foaming than the aforesaid homopolymer or block copolymer, and is suitable for foaming. In the prior art, it is considered necessary to crosslink polyolefin particles prior to pre-foaming. The present inventors, however, have found unexpectedly that the polypropylene resin of the present invention can be well expanded without cross-linking, and that they can be foamed better than cross-linked polyolefin particles.

The present invention provides substantially non-crosslinked pre-foamed particles of the polypropylene resin, in which the base resin is an ethylene/propylene random copolymer or a mixture of an ethylene/propylene random copolymer with low-density polyethylene and/or an ethylene/vinyl acetate copolymer; and a process for producing the pre-foamed particles of the polypropylene resin, which comprises dispersing substantially non-crosslinked polypropylene resin particles composed of an ethylene/propylene random copolymer or a mixture of an ethylene/propylene random copolymer and low-density polyethylene and/or an ethylene/vinyl acetate copolymer as a base resin and a volatile blowing agent in water in the presence of a dispersing agent within a closed vessel; heating them to a temperature above a point at which the particles soften, thereby to impregnate the blowing agent in the particles; and while maintaining the pressure of the inside of the vessel higher than the vapor pressure of the blowing agent, opening one end of the vessel to release the particles and water simultaneously into an atmosphere kept at a lower pressure than the inside of the vessel.

The ethylene/propylene random copolymer used in this invention desirably has an ethylene content of 1 to 20% by weight. If the ethylene content is less than 1% by weight, highly expanded foams are difficult to be obtained. If, on the other hand, it exceeds 20% by weight, the properties of polypropylene are lost, and for example, the heat resistance of the particles is reduced.

The base resin of the pre-foamed particles of this invention is an ethylene/propylene random copolymer or a mixture of it with low-density polyethylene and/or an ethylene/vinyl acetate copolymer. In the latter case, the content of low-density polyethylene and/or the ethylene/vinyl acetate copolymer in the mixture is preferably not more than 45% by weight. If the content exceeds 45% by weight, the properties of polypropylene will be lost. The low-density polyethylene may be any low-density polyethylene. Preferably, it has a density of 0.91 to 0.94. The ethylene/vinyl acetate copolymer preferably has a vinyl acetate content of 5 to 25% by weight.

In the present invention, the ethylene/propylene random copolymer or the mixture of it with the low-density polyethylene and/or the ethylene/vinyl acetate copolymer should be substantially non-crosslinked. It may be crosslinked to some extent, but preferably, the extent of crosslinking corresponds to a gel fraction of less than about 10% (this extent of crosslinking is included within the definition of "substantially non-crosslinked" in accordance with this invention).

In the production of the pre-foamed articles of the polypropylene resin in accordance with this invention, substantially non-crosslinked polypropylene resin particles composed of the ethylene/propylene random copolymer or the mixture of it with low density polyethylene and/or ethylene/vinyl acetate copolymer as a base resin and a volatile blowing agent are dispersed in water in the presence of a dispersing agent within a closed vessel. Examples of suitable volatile blowing agents for use in this invention include aliphatic hydrocarbons such as propane, butane, pentane, hexane and heptane; alicyclic hydrocarbons such as cyclobutane and cyclopentane; halogenated hydrocarbons such as trichlorofluoromethane, dichlorodifluoromethane, dichlorotetrafluoroethane, methyl chloride, ethyl chloride, and methylene chloride. The amount of the blowing agent varies depending upon the type of the blowing agent and the desired degree of foaming. It is usually 10 to 40 parts by weight per 100 parts by weight of the polypropylene resin.

The dispersing agent may, for example, be basic magnesium carbonate, basic zinc carbonate, calcium carbonate, etc. Basic magnesium carbonate is most suitable. The amount of the dispersing agent is usually 0.1 to 10 parts by weight per 100 parts by weight of the polypropylene resin.

In the next step of the process of this invention, the contents of the closed vessel are heated to a temperature above a point at which the polypropylene resin particles soften. This heating temperature is properly selected within the range in which foaming takes place favorable without destruction of the cellular structure. Usually, it is from 120° to 170° C. By this heating, the blowing agent is impregnated into the particles.

In the final step of the process of this invention, the contents of the vessel are released into an atmosphere kept at a lower pressure than the inside of the vessel while maintaining the pressure of the inside of the vessel higher than the vapor pressure of the blowing agent. The vapor pressure of the blowing agent denotes the vapor pressure of the blowing agent in a system in which the blowing agent is impregnated in the particles and the particles are dispersed in water. It does not necessarily coincide with the vapor pressure of the blowing agent which exists alone. Thus, the vapor pressure of the blowing agent, as referred to herein, varies depending upon the affinity of the blowing agent with the resin particles, the content of the blowing agent, the types and combinations of the blowing agents, etc., and cannot be generalized. The atmosphere into which the contents of the vessel, i.e. the particles containing the blowing agent and water, are simultaneously released may be at a lower pressure than the inside of the vessel. Usually, the pressure of the atmosphere is atmospheric pressure.

A foamed article can be prepared from the pre-foamed particles of the polypropylene resin obtained by the process of this invention, for example by aging the pre-foamed particles at a predetermined temperature under atmospheric pressure, and then aging them further at a predetermined temperature under a predetermined pressure using an inorganic gas or a mixture of it with a volatile blowing agent to apply an elevated pressure to the interior of the particles, then filling the particles into a mold, and heating them to produce foams. A foamed article conforming to the mold can thus be obtained.

Since the pre-foamed particles of this invention contain the ethylene/propylene random copolymer or its mixture with low-density polyethylene and/or an ethylene/vinyl acetate copolymer as a base resin, they have the advantage of possessing good viscoelastic flow characteristics and a broad temperature range suitable for foaming, and therefore, are easy to manufacture. Furthermore, since they can be foamed well without pre-crosslinking, the crosslinking step can be omitted, and the manufacturing process can be simplified.

Moreover, because the pre-foamed particles in accordance with this invention have a relatively low softening temperature, there is no likelihood of poor adhesion between the particles which constitute a foamed article obtained by the molding.

When the mixture of the ethylene/propylene random copolymer and the low-density polyethylene and/or ethylene/vinyl acetate copolymer is used as the base resin, the ratio of expansion and the adhesion of the particles to each other during molding increase advantageously. In addition, the process of the invention can afford homogeneous and highly expanded pre-foamed particles.

Foamed articles obtained from the pre-foamed particles of the invention can fully exhibit the characteristic of polypropylene, and have excellent heat resistance, chemical resistance and flexibility and high mechanical strength.

The following non-limitative examples illustrate the present invention specifically.

EXAMPLE

One hundred parts by weight of the particles of each of the resins shown in Table 1, 23 parts by weight of dichlorodifluoromethane, 2 parts by weight of basic magnesium carbonate and 250 parts by weight of water were put in a closed vessel, and the resin particles were dispersed in water. With stirring, the dispersion was heated to a temperature of 137° C. and maintained at this temperature for 0.5 hour. Then, while maintaining the pressure of the inside of the vessel at about 30 kg/cm$^2$.G, one end of the vessel was opened to release the resin particles and water simultaneously into the atmosphere. The resin particles were then dried to form pre-foamed particles having the apparent density shown in Table 2.

The pre-foamed particles were left to stand for 50 hours at room temperature and atmospheric pressure, and then for 50 hours at 20° C. and under an air pressure of 2 kg/cm$^2$.G. The particles were then filled in a mold, and molded under a steam pressure of 2 kg/cm$^2$.G. The adhering condition and properties of the molded article are shown in Table 2.

TABLE 1

| | Base resin of the particles (wt. %) | | | | |
|---|---|---|---|---|---|
| | Ethylene-propylene random copolymer | | Low-density poly-ethylene | Ethylene/vinyl acetate copolymer | Cross-linkage |
| | Ethylene content | Amount | | | |
| Invention | | | | | |
| 1 | 3.0 | 100 | — | — | No |
| 2 | 4.2 | 90 | 10 | — | No |
| 3 | 4.2 | 80 | 20 | — | No |
| 4 | 4.2 | 60 | 40 | — | No |
| 5 | 4.2 | 70 | — | 30 | No |
| Comparison | | | | | |
| 1 | Homopolymer of propylene | | | | No |
| 2 | Ethylene/propylene block copolymer (ethylene content 8 wt. %) | | | | No |
| 3 | 4.2 | 100 | — | — | Yes (gel fraction 30%) |

TABLE 2

| | | Pre-foamed particles | Foamed article | | | | |
|---|---|---|---|---|---|---|---|
| | | | | Properties | | | |
| | | Apparent density (g/cc)*3 | State of adhesion | Density (g/cc) | Compression hardness (kg/cm$^2$)*1 | Chemical resistance | Heat resistance (°C.)*2 |
| Invention | 1 | 0.042 | Good | 0.025 | 1.0 | Good | 120 |
| | 2 | 0.026 | Good | 0.027 | 0.95 | Good | 120 |
| | 3 | 0.024 | Good | 0.025 | 0.9 | Good | 120 |
| | 4 | 0.017 | Good | 0.018 | 0.8 | Good | 120 |
| | 5 | 0.021 | Good | 0.022 | 0.7 | Good | 120 |
| Comparison | 1 | 0.035 | Not adhered | — | — | — | — |
| | 2 | 0.032 | Not | — | — | — | — |

TABLE 2-continued

| Pre-foamed particles | | Foamed article | | | |
|---|---|---|---|---|---|
| | | Properties | | | |
| Apparent density (g/cc)[*3] | State of adhesion | Density (g/cc) | Compression hardness (kg/cm$^2$)[*1] | Chemical resistance | Heat resistance (°C.)[*2] |
| 3  0.060 | adhered Not adhered | — | — | — | — |

[*1]Measured by JIS K-6767.
[*2]The temperature at which the foamed article can be used for practical purposes.
[*3]The apparent density of the pre-foamed particles measured in a measuring cyclinder.

What we claim is:

1. Substantially non-crosslinked pre-foamed particles of a propylene copolymer resin selected from the group consisting of an ethylene/propylene random copolymer or a mixture of an ethylene/propylene random copolymer with low density polyethylene and/or an ethylene/vinyl acetate copolymer as a base resin, provided that the ethylene/propylene random copolymer has an ethylene contents of 1 to 20% by weight.

2. The pre-foamed particles of claim 1 wherein the content of the low-density polyethylene and/or the ethylene/vinyl acetate copolymer in the mixture is not more than 45% by weight.

3. A process for producing pre-foamed particles of a propylene copolymer resin, which comprises dispersing substantially non-crosslinked particles of a propylene copolymer resin selected from the group consisting of an ethylene/propylene random copolymer or a mixture of an ethylene/propylene random copolymer with low-density polyethylene and/or an ethylene/vinyl acetate copolymer provided that the ethylene/propylene random copolymer has an ethylene content 1 to 20% by weight and a volatile blowing agent in water in the presence of a dispersing agent within a closed vessel; heating the dispersion to a temperature above a temperature at which the resin particles soften, thereby to impregnate the blowing agent in the resin particles; and while maintaining the pressure of the inside of the vessel higher than the vapor pressure of the blowing agent, opening one end of the vessel to release the resin particles and water simultaneously into an atmosphere kept at a lower pressure than the inside of the vessel.

4. The process of claim 3 wherein the volatile blowing agent is at least one member selected from the group consisting of aliphatic hydrocarbons, alicyclic hydrocarbons and halogenated hydrocarbons.

5. The process of claim 3 wherein the blowing agent is used in an amount of 10 to 40 parts by weight per 100 parts by weight of the polypropylene resin.

6. The process of claim 3 wherein the dispersing agent is at least one member selected from the group consisting of basic magnesium carbonate, basic zinc carbonate and calcium carbonate.

7. The process of claim 3 wherein the dispersing agent is used in an amount of 0.1 to 10 parts by weight per 100 parts by weight of the polypropylene resin.

8. The process of claim 7 wherein the dispersing agent is basic magnesium carbonate.

9. The process of claim 3 wherein the content of the low density polyethylene and/or the ethylene/vinyl acetate copolymer in the mixture is not more than 45% by weight.

* * * * *